Figure 1:
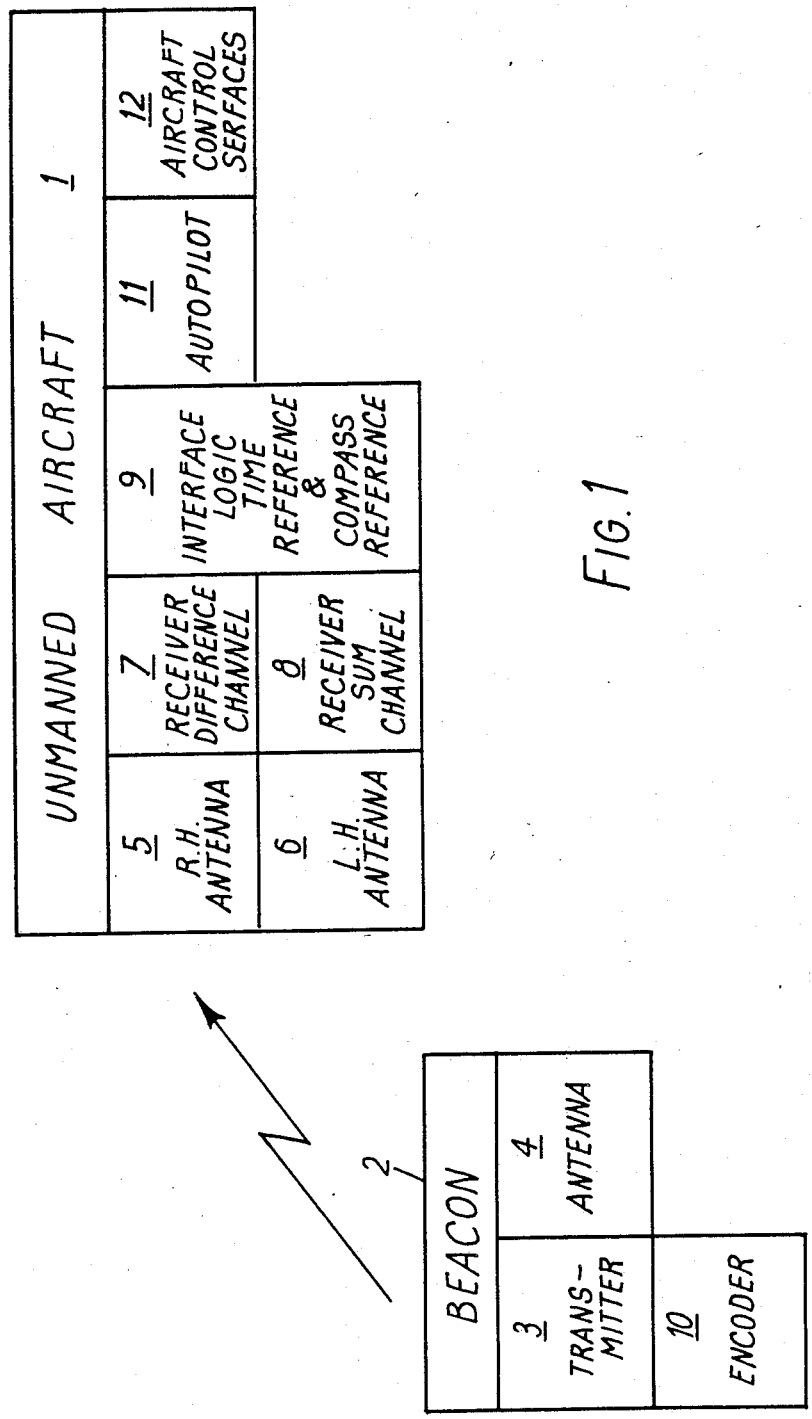

United States Patent [19]

Browning et al.

[11] Patent Number: 4,887,781
[45] Date of Patent: Dec. 19, 1989

[54] TRANSMITTERS

[75] Inventors: Nigel Browning, Uckfield; Arthur C. Fry, Woking; Robert L. H. Malpass, Ashford; Brian Matthews, Frimley Green; Michael S. Peters, Wokingham, all of England

[73] Assignee: British Aerospace Public Limited Company, London, England

[21] Appl. No.: 792,227

[22] Filed: Oct. 25, 1985

Related U.S. Application Data

[60] Continuation of Ser. No. 478,215, Mar. 24, 1983, which is a continuation of Ser. No. 210,118, Nov. 19, 1980, abandoned, which is a division of Ser. No. 926,975, Jul. 19, 1978.

[30] Foreign Application Priority Data

Jul. 23, 1977 [GB] United Kingdom ............... 31044/77

[51] Int. Cl.$^4$ ............................................. B64C 13/20
[52] U.S. Cl. .................................... 244/190; 244/3.14
[58] Field of Search ..................... 102/412,427; 367/2, 367/136, 188; 244/3.14, 3.19, 3.15, 189, 190

[56] References Cited

U.S. PATENT DOCUMENTS

| | | |
|---|---|---|
| 2,253,508 | 8/1941 | Crane et al. . |
| 2,751,541 | 6/1956 | Shuck .................................. 244/189 |
| 3,103,329 | 9/1963 | Unger et al. ......................... 244/189 |
| 3,360,772 | 12/1967 | Massa .................................. 367/188 |
| 3,474,405 | 10/1969 | Padberg, Jr. ......................... 367/136 |
| 3,569,923 | 3/1971 | Naubereit ............................ 367/136 |
| 3,859,598 | 1/1975 | McElwain et al. .................. 367/188 |
| 4,022,128 | 5/1977 | Watson ................................ 102/427 |
| 4,136,343 | 1/1979 | Heffner et al. ...................... 244/3.19 |
| 4,190,000 | 2/1980 | Shaull et al. ........................ 102/427 |
| 4,281,809 | 8/1981 | Oglesby et al. ..................... 244/3.14 |

OTHER PUBLICATIONS

The A.R.R.L. Antenna Book, American Radio Relay League, 1960, pp. 238 & 239.

*Primary Examiner*—Theodore M. Blum
*Attorney, Agent, or Firm*—Cushman, Darby & Cushman

[57] ABSTRACT

A transmitter for use in an aircraft navigation system, the transmitter comprising a body portion (35) having an end (36, 37) adapted for implanting into the ground and an opposite end fitted with an antenna (38,39), and stabilizing means (41) arranged to be rendered operative on impact of the transmitter with the ground.

6 Claims, 7 Drawing Sheets

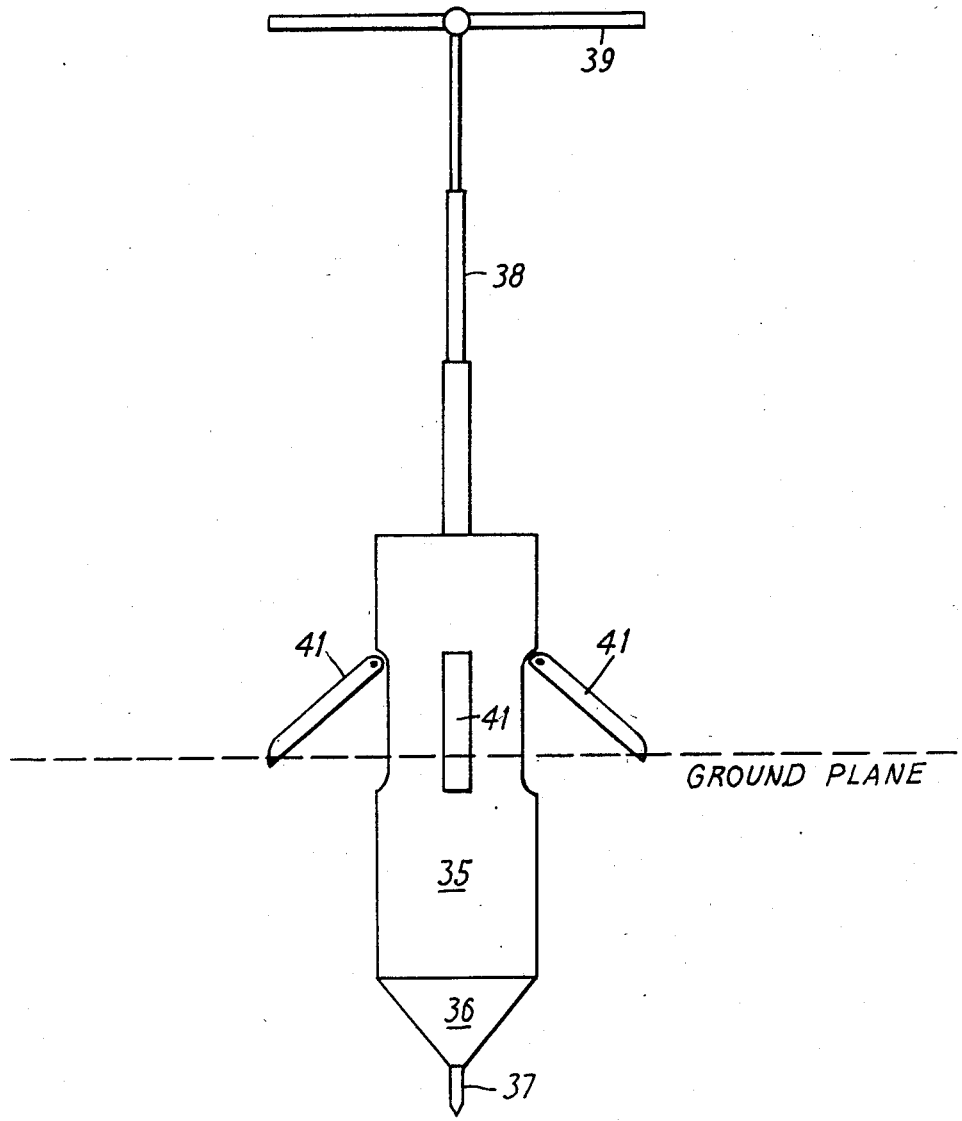

TRANSMITTERS

This is a continuation of application Ser. No. 210,118 filed Nov. 19, 1980.

RELATED APPLICATIONS

This application is a continuation of application Ser. No. 478,215 (filed Mar. 24, 1983) which was a continuation of application Ser. No. 210,118 (filed Nov. 19, 1980) which was a divisional application of Ser. No. 05/926,975 (filed July 19, 1978).

This invention relates to transmitters suitable, but not exclusively so, for aircraft navigation systems.

According to the present invention a transmitter comprises a body portion having an end adapted for implanting into the ground and an opposite end fitted with an antenna, and stabilising means arranged to be rendered operative on impact of the transmitter with the ground. The antenna may be in the form of two dipoles at right angles to each other and aerodynamically shaped to assist in the proper orientation of the transmitter during free fall. Preferably, each transmitter has a low magnetic signature and may be capable of receiving information, immediately prior to being placed or dropped, in the form of encoded positional information, transmission key codes, etc.

A transmitter in accordance with the invention is particularly suited for use with an aircraft navigation system for an unmanned aircraft such as disclosed in co-pending patent application Ser. No. 926,975 to Browning et al filed July 19, 1978.

Figure 2:
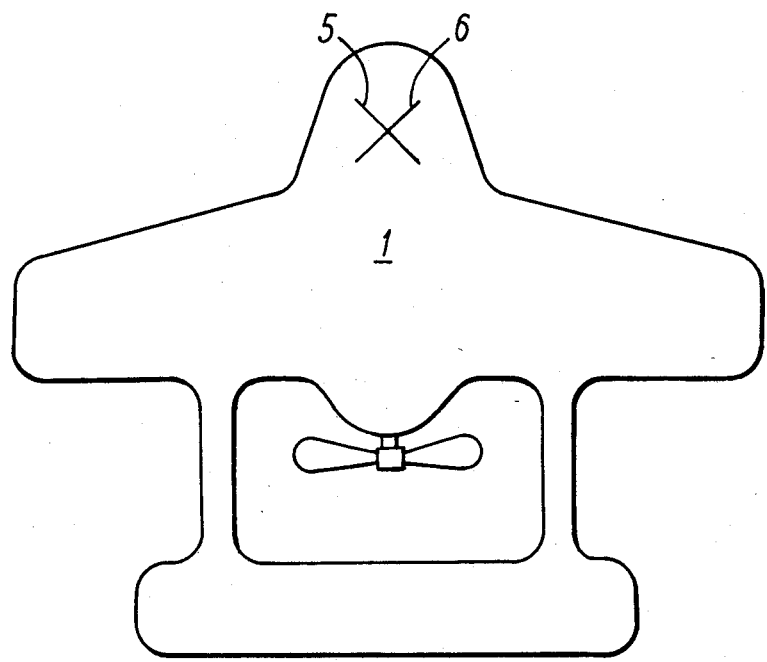
Figure 3:
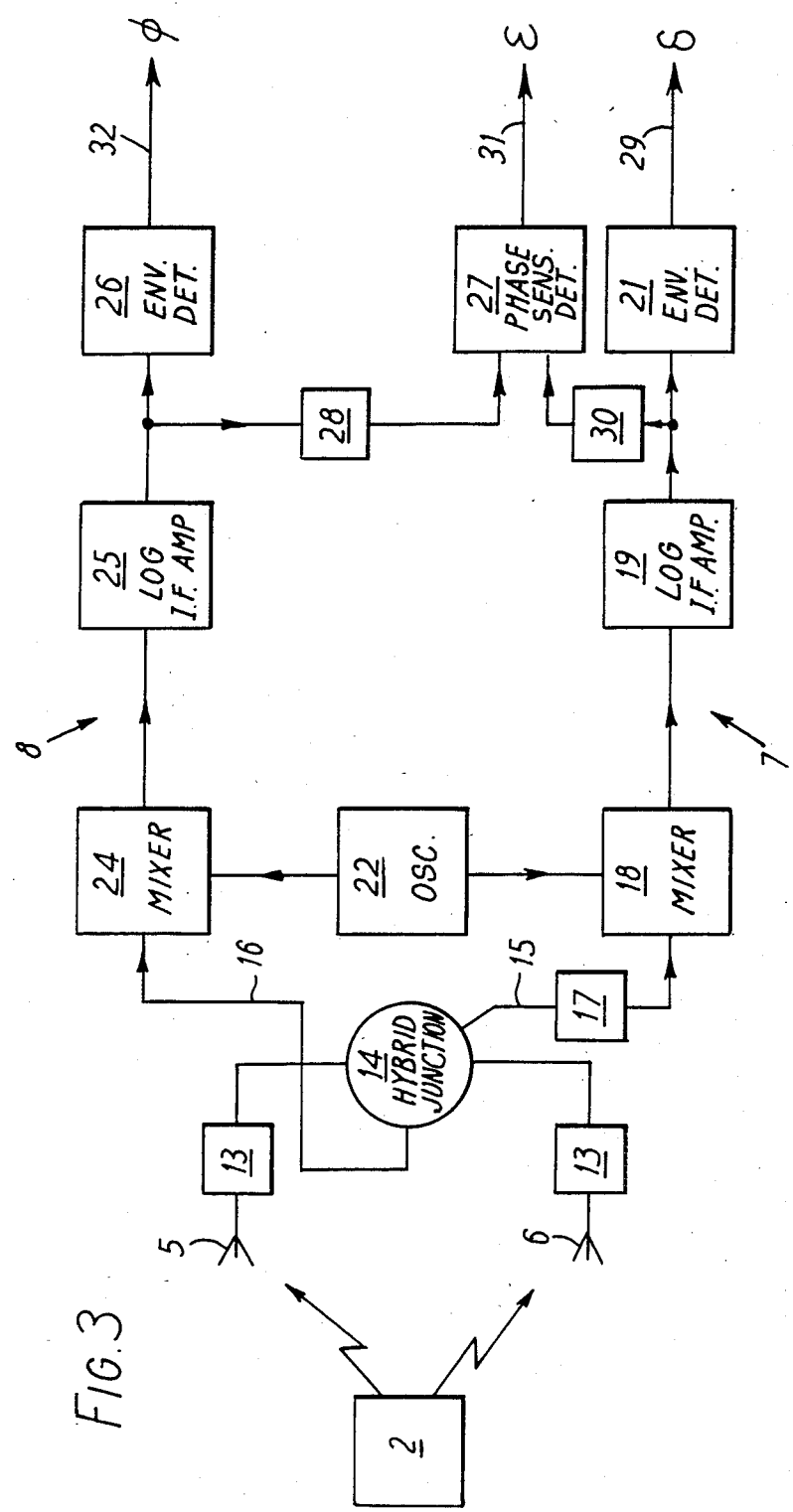
Figure 4:
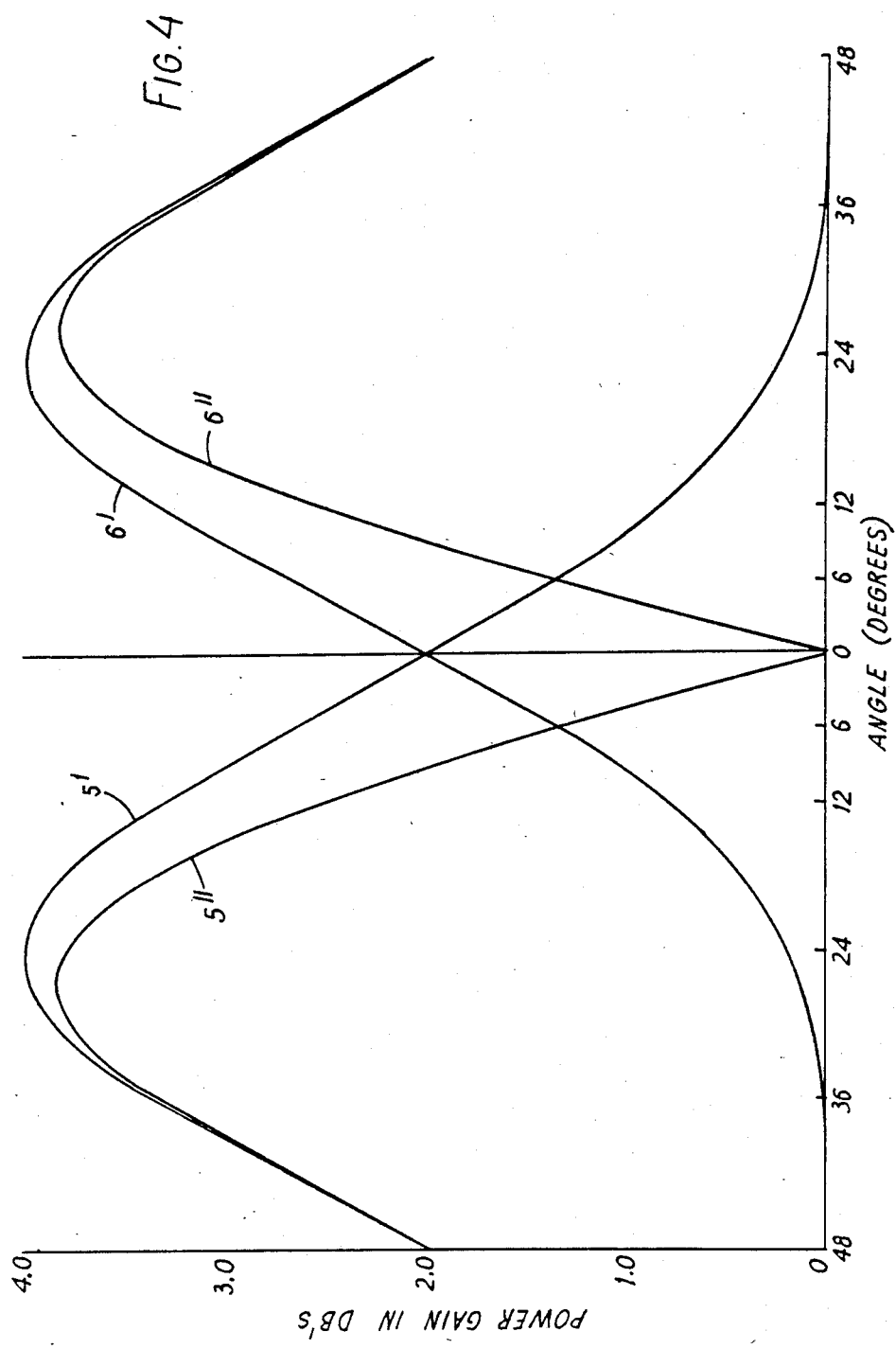
Figure 5:
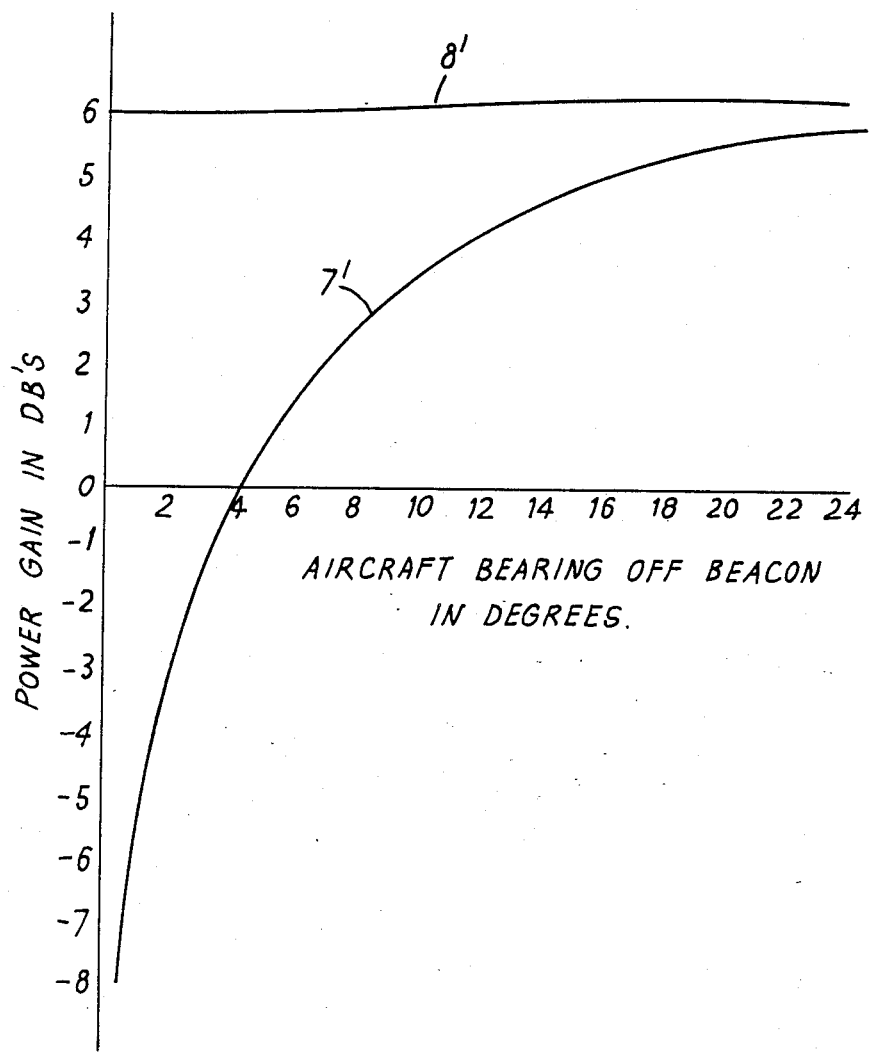
Figure 6:
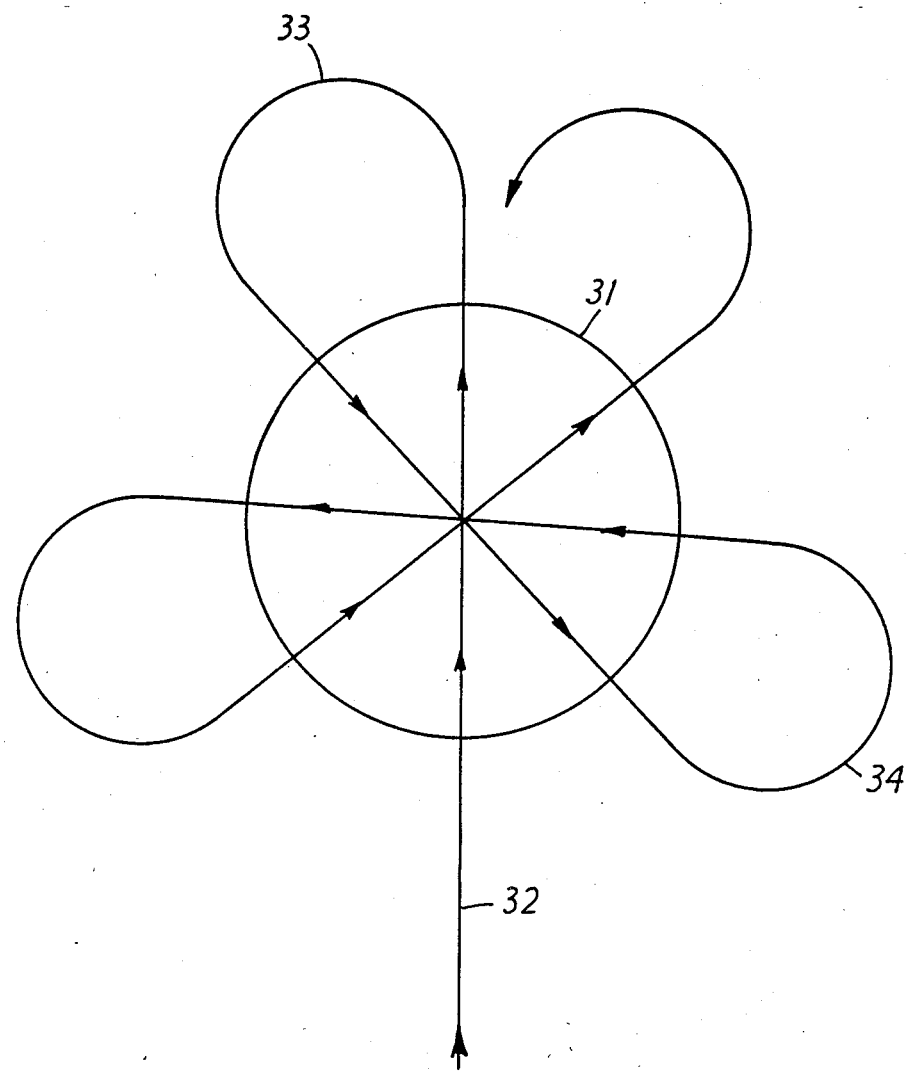

A navigation system for an aircraft incorporating a transmitter in accordance with the present invention will now be described in greater detail, by way of example, with reference to the accompanying drawings, in which FIG. 1 is a block diagram of the overall system, FIG. 2 shows the location of antenna on the aircraft, FIG. 3 is a block diagram showing part of FIG. 1 in greater detail, FIGS. 4 and 5 are explanatory graphs, FIG. 6 shows the flight path pattern of an aircraft navigated in accordance with one mode of operation of the system, and FIG. 7 shows, diagrammatically, the form of a transmitter forming part of the system.

The illustrated system is designed for an unmanned aircraft which is indicated at 1 in FIG. 2.

Referring to FIG. 1, the system comprises at least one transmitter means in the form of a beacon 2 having an encoder 10, a transmitter 3 and an antenna 4. The system further comprises receiver means mounted in the aircraft 1 and including right-hand and left-hand antennae 5 and 6, a receiver difference channel 7, a receiver sum channel 8 and interface 9. The receiver means are connected to an autopilot 11 for the aircraft which controls the aircraft control surfaces 12 in conventional fashion. As shown in FIG. 2, the right-hand and left-hand antennae 5 and 6 are mounted in the nose of the aircraft and at an angle to the fore-and-aft axis of the latter such that the polar diagrams overlap and are inclined to said fore-and-aft axis. Each antenna 5 and 6 is a centre-fed dipole and is offset from the aircraft fore-and-aft axis by 45 degrees such that it is both forward and rearward looking.

FIG. 3 shows the receiver difference and sum channels 7 and 8 in greater detail. Each antenna 5 and 6 is connected to a filter 13 and thence to a hybrid junction 14 from which are derived a difference signal on line 15 and a summed signal on line 16. The line 15 is connected to the receiver difference channel 7 which comprises an RF amplifier 17, a mixer 18, a logarithmic IF amplifier 19 and an envelope detector 21. A local oscillator 22 is common to both the receiver difference and sum channels 7 and 8, the oscillator 22 being connected to the mixer 18 in the channel 7.

The receiver sum channel 8 comprises a mixer 24, an IF amplifier 25 and an envelope detector 26, with the oscillator 22 being connected as an input to the mixer 24. A phase-sensitive detector 27 receives as inputs the outputs from the logarithmic IF amplifiers 19 and 25 via automatic gain control amplifiers 28 and 30. The automatic gain control amplifiers 28 and 30 are included so that the power levels at the two inputs to the phase sensitive detector 27 are the same.

The receiver difference and sum channels 7 and 8 are in fact in the form of a conventional fixed tuned superheterodyne receiver.

The output $\delta$ on line 29 of the receiver difference channel 7 provides a turn rate demand signal to the autopilot 11 and the output signal $\epsilon$ on line 31 from the phase sensitive detector 17 gives the sense or direction of the turn required. The output signal $\phi$ on line 32 from the receiver sum channel 8 indicates received signal strength and this signal is fed to an adjustable threshold detector contained in the interface 9, the detector providing an output signal when the input signals drop below or above, as appropriate, predetermined levels, whereupon a constant rate of turn command signal is fed to the autopilot 11 and during the presence of that signal, the outputs from the receiver difference channel 7 and the phase sensitive detector 27 are inhibited.

The interface 9 includes a clock to provide a time reference and a compass reference which may be obtained from a flux gate. The interface 9 also includes a programmable missing pulse detector so that only preselected beacon codes can activate the system, the transmitter 3 of each beacon having a fixed frequency output which is pulsed and coded by varying pulse length and interpulse period.

FIG. 4 is a graph of gain against aircraft heading angle relative to a given beacon 2, lines 5' and 6' indicating the gain patterns of the two antennae 5 and 6, and the lines 5" and 6" indicating the error signal gain patterns. FIG. 5 is a graph of gain against aircraft heading relative to a given beacon 2 for the receiver difference and sum channels 7 and 8, line 7' indicating the former and line 8' the latter. It will be appreciated that when a given beacon is transmitting and being received by the antennae 5 and 6 the difference in amplitudes of the signals received at the respective antennae as detected by the receiver difference channel 7 indicates whether there is a discrepancy in the heading of the aircraft which is due to fly over the beacon. If there is no discrepancy, then a zero output signal $\delta$ results and no command is given to the autopilot 11. However, if there is a discrepancy then the output signal $\delta$ constitutes a command signal for the autopilot 11 and the phase-sensitive detector output signal $\epsilon$ gives the sense of that command signal and the autopilot effects the demanded change in aircraft heading through the control surfaces 12, this being a continuous process. If desired, the system can be arranged to take account of wind speed and direction.

A given beacon will have a specific transmission area which is indicated by the circle 31 in FIG. 6 and assuming the aircraft 2 is launched in a direction 32 towards the beacon it will be navigated over the latter as already described. As the aircraft moves away from the beacon the receiver sum channel 8 output signal φ tends to decrease as the received signal strength decreases but will in fact remain approximately constant whilst the logarithmic IF amplifier 25 is operating within its limiting region. When this signal falls below the predetermined thresholds set by the adjustable threshold detector in the interface 9, the predetermined turn rate command signal is given to the autopilot 11 and the aircraft 1 will make a left-hand turn around the path 33 as seen in FIG. 6. Once the aircraft 1 re-enters the effective area 31 of the beacon, the system will again navigate the aircraft over the beacon until another turn rate command signal is initiated, whereby the aircraft will again make a left-hand turn as shown at 34 and this procedure will continue so that the aircraft will fly in a precessing figure-of-eight flight path as shown in FIG. 6 until recalled to base or deployed on another exercise. The received signal strength will fall as the aircraft 1 goes through nulls in the beacon radiation pattern; thus an automatic turn rate command would be initiated when not required. However lags within the system autopilot 11 and the aircraft response are sufficiently long so that the aircraft trajectory will not change significantly during the period that the aircraft is in the null. On leaving the null, the aricraft 1 will once again attempt to head directly towards or away from the beacon 2.

It will be seen from FIG. 6 that the aircraft 1 can be made to loiter over an area in excess of that of the beacon transmission area, basic variation in the loiter area being effected by adjustment of the adjustable threshold detector in the interface 9. Should it be desired to increase the loiter area beyond that possible using the adjustable threshold detector, a timing machanism may be employed which inhibits the predetermined turn rate command signal for a predetermined period after it would have been initiated in normal circumstances by the adjustable threshold detector.

The aircraft may be fitted with means for detecting the presence of a radar installation or vehicle in the vicinity of the beacon over which it is operating in the tethered loiter mode and upon such detection it may then be commanded to destroy the sensed target with weaponry which it is carrying or act as a marker for other weapon systems. If the aircraft is undertaking a general reconnaissance role, the interface 9 may be programmed such that the aircraft operates in the tethered loiter mode over a first preselected beacon then moves on to a second preselected beacon and again operates in the tethered loiter mode and so on. The aircraft may have a telemetry link with the base station.

Normally, the first beacon over which the aircraft is to operate in the tethered loiter mode is some distance away from the base station, whereby it is preferable to aid the aircraft in locating that beacon since a launch in the general direction thereof may not be sufficient. To this end, a series of beacons 2 may be deployed along the desired route with overlapping transmission areas, each with the same or a different code and the interface 9 programmed such that the aircraft 1 will receive the transmission from the first beacon and be navigated thereover using the technique described above but without making a turn when the received signal strength falls below a predetermined level. Once clear of the first beacon, the aircraft will then be arranged to lock on to the next beacon and fly thereover, and so on until the beacon is reached over which the aircraft is to operate in the tethered loiter mode.

It should be noted that the navigation system only requires azimuth bearing information of a beacon 2 and does not necessarily have to fly directly over the beacon. It should also be noted that whilst the effective area of a beacon has been indicated by a circle 31 in FIG. 6, this is the ideal situation and it may be that the effective area is, in fact, an irregular shape due to obstructions, such as tall buildings, in the area but this in no way impairs the efficiency of the navigation system. If an obstruction decreases the received signal strength prematurely, the aircraft merely makes an early turn and there is no question of "losing" the beacon 2.

FIG. 7 shows one form of beacon transmitter 2 in accordance with the present invention. The beacon 2 has a generally cylindrical body 35 having a tapered end 36 fitted with a spike 37 which enables it to be implanted into the ground either by hand or resulting from a drop from an aircraft. The other end of the body 35 carries a mast 38 to which is fitted an antenna 39 in the form of two dipoles at right angles to each other and aerodynamically shaped to assist in the proper orientation of the beacon during free fall. A $\pi/2$ phase shifter (not shown) is included in the antenna feed to ensure that the two dipoles are fed in quadrature. The antenna 39 has an omnidirectional radiation pattern as for a small horizontal loop, the transmitted signals being horizontally polarised. The antenna 39 is connected to a conventional fixed frequency transmitter contained within the body 35, the output signal therefrom being pulsed and coded by varying pulse length and interpulse period as already mentioned. Fitted to the exterior of the body 35 and equispaced therearound are four stabilising feet 41 which are arranged automatically to move from a position in which they are generally flush with the surface of the body 35 to an operative position in which they extend from the body and engage the ground as shown in FIG. 7. The beacon 2 may be fitted with a destructive device (not shown) which may be activated a preset time after placement or drop or in the event of interference by way of examination or relocation. The destructive charge may be large enough to provide an anti-personnel function. The beacon 2 is small enough for it to be camouflaged so as to resemble, for example, an everyday object such as a can of soft drink. The beacon preferably has a low magnetic signature and to this end may have the body 35 made from a plastic or glass-reinforced plastic material.

The main operational constraint on the described system is the range at which the beacons 2 can be detected by the aircraft 1. This is itself critically dependent upon the beacon transmitter design and the antenna characteristics at low angles of incidence with the ground. Obviously this very much depends on the characteristics of the transmission area terrain (hill shapes, vegetation and buildings) and the actual immediate location and orientation of the becaon antenna 39, bearing in mind the beacon could be in a ditch or furrow, or badly tilted. The detection range will increase with the altitude of the aircraft 1 but it is desirable to keep its flight path as low as possible to reduce its vulnerability.

Detection range determines detection area. The larger this area, the greater is the error allowable on the launch range and bearing estimates. Also, the greater is the tolerance allowable in the systems that are used to take the aircraft 1 to a particular beacon and to return it to the beacon after carrying out a search excursion outside the detection range. Thus the distance from which the aircraft 1 can be launched at say a specific covertly placed beacon 2, the area covered by the aircraft in the tethered loiter mode and the altitude at which the aircraft can be flown are all determined essentially by the detection range of the beacons.

The choice of operating frequency for the system is mainly influenced by the constraints of antenna size, and environmental effects. Because of the need to achieve reasonable gains from a small antenna, frequencies below about 300 MHz can be discounted. The upper frequency limit is determined by environmental effects of which terrain screening is the most significant. A transmitter that is situated at ground level is likely to be severely affected by screening from trees, buildings etc., if such obstacles offer high attenuation at the carrier frequency. The attenuation of such obstacles is frequency dependent (for example the attenuation of a dry brick wall is about 2 dB at 400 MHz and 10 dB at 300 MHz) and favours the choice of low frequencies.

Horizontal polarisation is most suitable, since with vertical polarisation the antenna polar diagram is highly dependent upon ground constants and the low angle performance is difficult to predict.

We claim:

1. A navigation system for an unmanned aircraft comprising:

a plurality of transmitters for being dropped at spaced positions in an area incorporating a desired flight path, each transmitter being operable to transmit a signal to be received by said aircraft, each transmitter including a body portion, an antenna fitted to said body portion, the antenna comprising two dipoles at right angles to each other and aerodynamically shaped to assist in the proper orientation of the transmitter during free fall, and stabilising means arranged to be operative on impact of the transmitter with the ground so as to stabilise the antenna in an upright position;

receiver means, mounted in said aircraft, for receiving said signals; and an autopilot, mounted in said aircraft, for controlling, responsive to said signals received by said receiver means, aircraft control surfaces for navigating said aircraft in accordance with said signals.

2. A system according to claim 11, wherein the stabilising means comprise feet that are pivotally attached to the body and are inclined downwardly from the body when in the operative position.

3. A system according to claim 1 wherein each transmitter further comprises power supply means which are rendered operative on impact of the transmitter with the ground.

4. A system according to claim 1 wherein each transmitter further comprises power supply means which are rendered operative by a timing mechanism.

5. A system according to claim 1 wherein each transmitter further comprises power supply means which are rendered operative by an acoustic switch.

6. A navigation system according to claim 1 wherein said transmitter body portion has an end adapted for implanting into the ground.

* * * * *